(12) United States Patent
Hidaka et al.

(10) Patent No.: US 6,400,124 B1
(45) Date of Patent: Jun. 4, 2002

(54) BATTERY CHARGER

(75) Inventors: Takayuki Hidaka; Toshio Okamura, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/901,593

(22) Filed: Jul. 11, 2001

(30) Foreign Application Priority Data

Dec. 18, 2000 (JP) .................................. 2000-383463

(51) Int. Cl.[7] .................................................. H02J 7/04
(52) U.S. Cl. ..................................................... 320/145
(58) Field of Search ................................ 320/141, 145

(56) References Cited

U.S. PATENT DOCUMENTS 5,617,007 A * 4/1997 Keidl et al. .................. 320/141

FOREIGN PATENT DOCUMENTS

JP 7-087673 3/1995
JP 2000-350378 12/2000

OTHER PUBLICATIONS

U.S. Patent No. 09/443,286, Masayoshi Goto et al., "Battery Accumulating Apparatus", Nov. 19, 1999.

* cited by examiner

Primary Examiner—Adolf Deneke Berhane
Assistant Examiner—Pia Tibbits
(74) Attorney, Agent, or Firm—Burns, Doane, Swecker & Mathis, LLP

(57) ABSTRACT

In a battery charger for charging a plurality of battery cells connected in series with each other with a constant current in a batch manner, the present invention is intended to suppress the generation of heat in cell shunt circuit sections which are provided as overheat protective measures for the individual cells. Surplus energy, which is generated in the cell shunt circuit sections by the product of a cell voltage and a shunt current and which becomes a heat generating source, is regenerated to a charger side via a flyback transformer provided in each of the cell shunt circuit sections, thereby suppressing heat generation.

5 Claims, 5 Drawing Sheets

FIG. 4A
SHUNT CURRENT ($I_p$)
FIG. 4B
FEEDBACK CURRENT ($I_{bck}$)
FIG. 4C
CELL CHARGING CURRENT ($I_{cel}$)
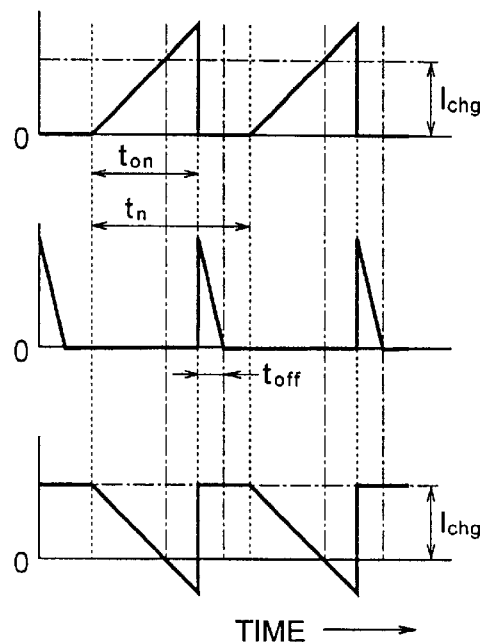
FIG. 5A
CELL VOLTAGE ($V_c$)
FIG. 5B
OPERATION TIMING OF CELL SHUNT CIRCUIT SECTIONS ($S_{h1} \sim S_{hn}$)
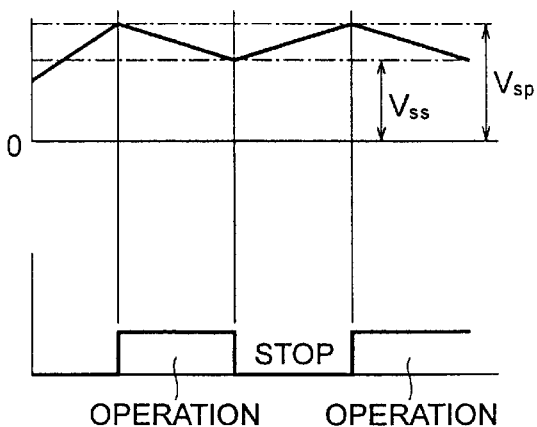

BATTERY CHARGER

This application is based on Application No. 2000-383463, filed in Japan on Dec. 18, 2000, the contents of which are hereby incorporated by reference.

BACKGROUND OF THE INVENTION

1. Field of the Invention

The present invention relates to a battery charger provided with a cell shunt (charging current shunt) circuit capable of protecting the overcharge of a plurality of individual lithium ion battery cells connected in series with one another to constitute a lithium ion battery for example, which can be installed on a satellite, spacecraft, etc.

2. Description of the Related Art

FIG. 6 illustrates a known lithium ion battery charger. The known battery charger includes a plurality of lithium ion battery cells $C_1$–$C_n$, and a plurality of cell shunt circuit sections $Sh_1$–$Sh_n$, and a constant current controller 8. Each of the cell shunt circuit sections $Sh_1$–$Sh_n$ is constituted by a shunt transistor 4, a reference voltage generating section 5, and a comparator 7. In addition, a symbol Ichg represents a battery charging current, $I_P$ a shunt current, $V_c$ a cell voltage, and $V_s$ a reference voltage generated by the reference voltage generating section 5.

In a nickel cadmium battery and a nickel hydrogen battery used in the past as batteries for a satellite and a spacecraft, a plurality of battery cells connected in series with one another are charged by performing batch constant-current charging in order to achieve reduction in resources of a battery charger and improvements in reliability. On the other hand, lithium ion battery cells, which have high energy density and various excellent characteristics for installation on a satellite and a spacecraft, are becoming the mainstream of future satellite and spacecraft batteries.

In such a batch constant-current charging method, however, variations in individual capacities of the battery cells result in variations in the charging amounts for the respective cells, so that some battery cells may be overcharged.

In particular, lithium ion battery cells have a characteristic that the life-time property is remarkably decreased due to overcharging. This is a weak point for satellite and spacecraft batteries for which a long life time is required. Thus, the lithium ion battery charger as referred to above is required in order to cope with such a problem.

The known lithium ion battery charger is constructed as shown in FIG. 6. In this known battery charger, the constant current controller 8 performs power conversion based on the electric power from a primary power supply input section 10 to generate, through constant current control, a battery charging current $I_{chg}$, which is supplied to the lithium ion battery cells $C_1$–$C_n$ connected in series with the constant current controller 8 to charge the lithium ion battery cells $C_1$–$C_n$ in a batch processing manner.

By this charging, charge energy is uniformly accumulated in the respective lithium ion battery cells $C_1$–$C_n$ in proportion to the product of the battery charging current $I_{chg}$ and a charging time or duration It. In this process, a cell voltage $V_c$ in each of the lithium ion battery cells $C_1$–$C_n$ rises according to a charge energy limit of each cell or variations in the capacities of the cells. Although a cell having the smallest capacity first reaches a charging completion voltage, charging is continued until all the lithium ion battery cells $C_1$–$C_n$ reach the charging completion voltage.

In this charging operation, when a lithium ion battery cell $C_1$ first reaches the charging completion voltage for instance, the comparator 7 in the cell shunt circuit section $Sh_1$ detects that a voltage $V_c$ across the cell $C_1$ reaches a reference voltage $V_s$ which is preset to a value equal to the charging completion voltage, and drives the shunt transistor 4, so that a surplus current (hereinafter, called a shunt current $I_p$) is shunted from the battery charging current $I_{chg}$, thus preventing the battery charging current $I_{chg}$ from being supplied to the lithium ion battery cell $C_1$. The above-mentioned operation is similarly performed in each of the cell shunt circuit sections $Sh_1$–$Sh_n$, whereby each of the lithium ion battery cells $C_1$–$C_n$ is prevented from being overcharged in the continued charging operation.

In the lithium ion battery charger as described above, by shunting the shunt current $I_p$ from the battery charging current $I_{chg}$ through each shunt transistor 4, the lithium ion battery cells $C_1$–$C_n$ are prevented from being overcharged. However, the shunt current $I_p$ flows through each shunt transistor 4 to generate heat P therein, as expressed by the following equation (1).

$$P = I_{chg} \times V_c \tag{1}$$

This heat P makes the thermal design of a satellite or spacecraft battery system difficult. Moreover, it is a factor of disturbing the reduction in resources and the improvement in reliability of the battery charger.

SUMMARY OF THE INVENTION

The present invention is intended to solve above-mentioned drawbacks, and the object of the present invention is to suppress the generation of heat in a battery charger.

Bearing the above object in mind, the present invention resided in a battery charger for charging a plurality of battery cells connected in series with one another with a constant current in a batch manner, the battery charger including a plurality of cell shunt circuit sections connected in parallel with the battery cells, respectively, a plurality of cell voltage detecting sections for detecting cell voltages of the battery cells, respectively, and a cell shunt driving unit for driving the cell shunt circuit sections, respectively. Each of the cell shunt circuit sections comprises: an energy reservoir acting as a bypass path for bypassing a charging current supplied to a corresponding one of the battery cells so as to be input to the following battery cell provided at a downstream side of the one battery cell so as to reserve surplus energy obtained from the charging current thus bypassed and regenerate the thus reserved surplus energy to a batch charging line connected with the serially connected battery cells; and a switching element inserted in the bypass path for opening and closing thereof. The cell shunt driving unit compares a voltage detected by each of the cell voltage detecting section with a reference voltage, and outputs to the switching element of each of the cell shunt circuit sections a drive pulse signal of a pulse width corresponding to a difference between the detected voltage and the reference voltage. The energy reservoir regenerates the surplus energy to the batch charging line when the switching element opens the bypass path based on the drive pulse signal from the cell shunt driving unit.

In a preferred form of the present invention, the energy reservoir comprises a flyback transformer having a primary winding and a secondary winding, the flyback transformer being operable to bypass a battery cell charging current flowing in its primary winding through the switching element and regenerate an output of its secondary winding in a direction of the batch charging line through a reverse-flow preventive diode.

In another preferred form of the present invention, the cell shunt driving unit comprises a plurality of cell shunt driving sections provided one for each of the cell shunt circuit sections. Each of the cell shunt driving sections comprises: a differential amplifying section for comparing the voltage detected by a corresponding one of the cell voltage detecting sections and the reference voltage to output a difference therebetween; and a switch driving section for controlling the pulse width of the drive pulse signal in accordance with an output of the differential amplifying section thereby to control the opening and closing of a corresponding one of the switching elements based on the thus controlled pulse Width.

In a further preferred form of the present invention, the cell shunt driving unit comprises a plurality of cell shunt driving sections provided one for each of the cell shunt circuit sections. Each of the cell shunt driving sections comprises: a comparator for comparing the voltage detected by a corresponding one of the cell voltage detecting sections with the reference voltage to generate an output signal representative of a comparison result; and a fixed pulse width switch driving section for outputting a fixed driving pulse signal with a preset pulse width to the corresponding switching element based on the output signal of the comparator.

In a yet further preferred form of the present invention, the cell shunt driving unit comprises a cell shunt driving section provided in common for the plurality of cell shunt circuit sections. The cell shunt driving section comprises: a switching section including a plurality of switches connected with the switching element s, respectively; a switch selection controller for selecting one of the switches of the switching section to control the opening and closing thereof; a multiplexer controller for performing a selection setting of the voltage detected by each of the cell voltage detecting sections and notifying the selection setting to the switch selection controller; a multiplexer for successively selecting and outputting one of the voltages detected by the plurality of cell voltage detecting sections based on the selection setting of the multiplexer controller; a comparator for comparing the detected voltage output from the multiplexer with the reference voltage to generate an output signal representative of a comparison result; and a fixed pulse width switch driving section for outputting a fixed driving pulse signal with a preset pulse width. The switch selection controller closes, when detecting based on the output signal of the comparator that the detected voltage is greater than the reference voltage, the switch selected based on the selection setting of the multiplexer controller, and outputs the fixed driving pulse signal from the fixed pulse width switch driving section to a corresponding one of the switching elements through the closed switch.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIGS. 4A through 4C are time charts illustrating operating states (i.e., shunt current, feedback current and cell charging current) of respective portions of the lithium ion battery chargers according to the first through third embodiments of the present invention.

FIGS. 5A and 5B are time charts illustrating operating states (i.e., cell voltage and operation timing) of respective portions of the lithium ion battery chargers according to the second and third embodiments of the present invention.

DESCRIPTION OF THE PREFERRED EMBODIMENTS

Now, preferred embodiments of the present invention will be described in detail while referring to the accompanying drawings.

Embodiment 1

Figure 1:
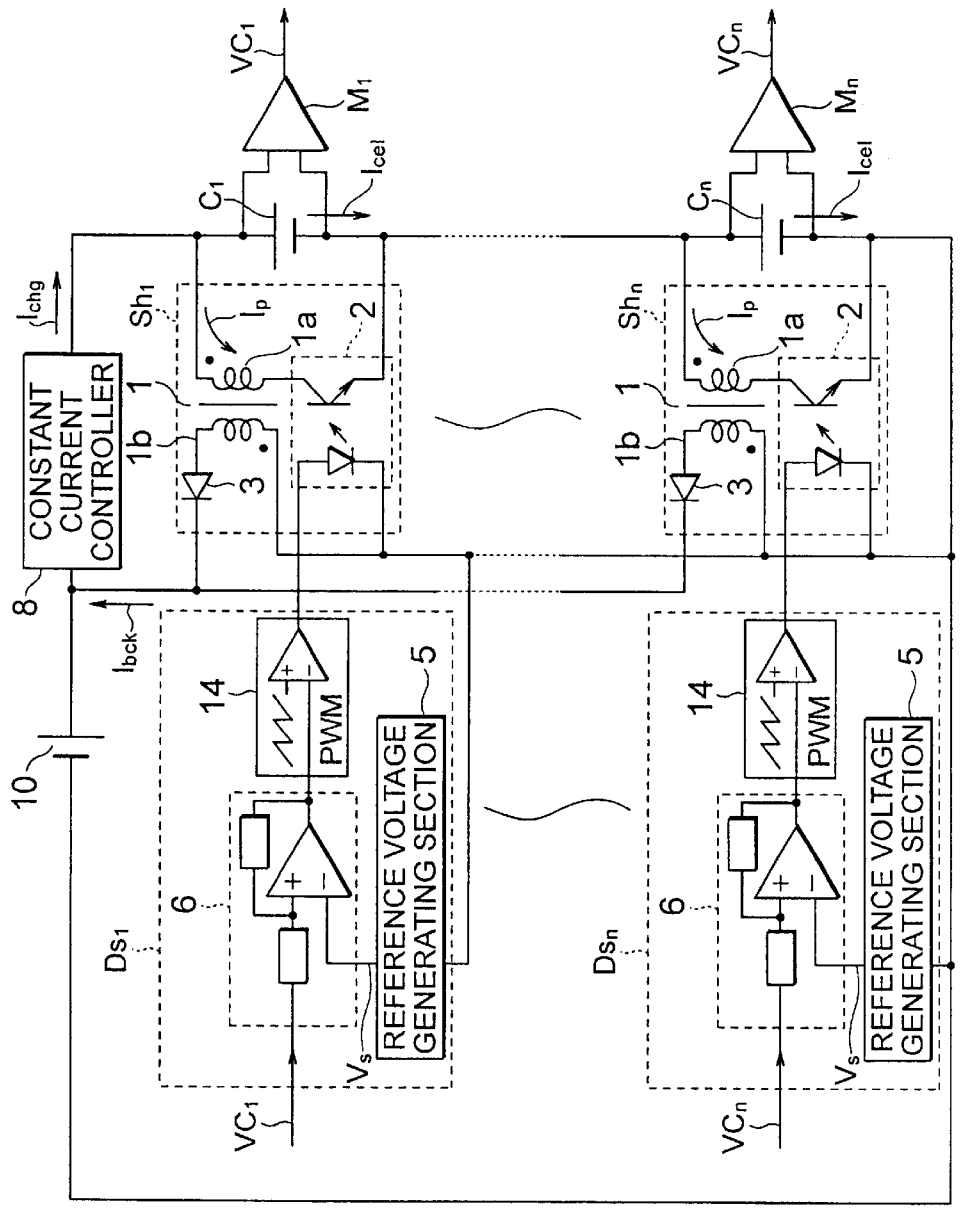
FIG. 1 is a constructional view illustrating a lithium ion battery charger according to a first embodiment of the present invention.

FIG. 1 is a circuit diagram showing a first embodiment of the present invention, and symbols 8, 10 and $C_1$–$C_n$ designate quite the same components as those of the known apparatus described above. In FIG. 1, a battery charger according to this embodiment includes a plurality of cell voltage detecting sections $M_1$–$M_n$, a cell shunt driving unit comprised of a plurality of cell shunt driving sections $D_{s1}$–$D_{sn}$, and a plurality of cell shunt circuit sections $Sh_1$–$Sh_n$. Each of the cell shunt circuit sections $Sh_1$–$Sh_n$ includes a flyback transformer 1 having a primary winding 1a and a secondary winding 1b, a switching element 2 comprised of a switching section in the form of a photodiode and a driving section in the form of a phototransistor, and a diode 3 connected to the secondary winding 1b of the flyback transformer 1 for inputting the output thereof to an upstream or input side of the constant current controller 8. Each of the cell shunt driving sections $D_{s1}$–$D_{sn}$ includes a reference voltage generating section 5, a differential amplifier circuit 6, and a switch driving section 14 having a pulse width control function. Symbols $I_{chg}$ represents a battery charging current for charging the battery cells $C_1$–$C_n$, $I_p$ a shunt current in each of the cell shunt circuit sections $Sh_1$–$Sh_n$, $I_{cel}$, a cell charging current actually flowing in each of the lithium ion battery cells $C_1$–$C_n$, $I_{bck}$ a feedback current flowing from the secondary winding 1b of each flyback transformer 1 into the constant current controller 8, $VC_1$–$VC_n$ cell voltage monitoring signals generated by the cell voltage detecting sections $M_1$–$M_n$, respectively, and $V_s$ a reference voltage generated by each reference voltage generating section 5.

In the lithium ion battery charger as constructed above, reference will hereinbelow be made to the case where the cell voltage $V_c$ of a lithium ion battery cell $C_1$ first reaches a charging completion voltage for instance.

In a cell shunt driving section $D_{s1}$, a differential amplifying section in the form of a differential amplifier circuit 6 receives a detection signal in the form of a cell voltage monitoring signal $VC_1$ from a cell voltage detecting section $M_1$, compares the signal level of the voltage monitoring signal VC, with the reference voltage $V_s$ which is preset to a value corresponding to a charging completion voltage in conformity with the cell voltage monitoring signal $VC_1$, and outputs a difference signal representative of a difference between the cell voltage monitoring signal $VC_1$ and the reference voltage $V_s$ to the switch driving section 14.

Subsequently, the switch driving section 14 receives a sawtooth signal at its positive input terminal, and the difference signal from the differential amplifier circuit 6 at its negative input terminal, and compares their signal levels with each other. When the signal level of the sawtooth signal is greater than the signal level of the difference signal, the switch driving section 14 outputs a drive pulse signal to the switching element 2 of the corresponding cell shunt circuit section $Sh_1$.

That is, the switch driving section 14 is able to control the pulse width of the drive pulse signal in accordance with a variation in the difference signal from the differential amplifier circuit 6, whereby the switching element 2 is driven to open and close based on the drive pulse signal (hereinafter, referred to as switch driving operation).

Then, the switching element 2 is driven to perform the switch driving operation based on the drive pulse signal, so that a bypass path to the lithium ion battery cell $C_1$ is closed upon closure of the switching element 2, whereas the bypass path to the lithium ion battery cell $C_1$ is opened upon opening of the switching element 2.

In actuality, in the course of the switch driving operation being carried out on the basis of the drive pulse signal, when the switching element 2 is in a closed state, the bypass path is closed, permitting part of a shunt current $I_p$ to be shunted from the battery charging current $I_{chg}$ to the primary winding $1a$ of the flyback transformer 1. In this case, the remaining part of the battery charging current $I_{chg}$ flows into the lithium ion battery cell $C_1$, and that part of the battery charging current $I_{chg}$, i.e., what is given by subtracting the shunt current $I_p$ from the battery charging current $I_{chg}$, is hereinafter called "a cell charging current $I_{cel}$".

Here, in the flyback transformer 1 acting as an energy reservoir, the shunt current $I_p$ flows in the primary winding $1a$, thereby suppressing the inflow of the battery charging current $I_{chg}$ into the lithium ion battery cell $C_1$. At this time, the electric energy produced by the shunt current $I_p$ and the cell voltage $V_c$ (hereinafter, referred to as surplus energy) is reserved in the flyback transformer In addition, the output of the secondary winding $1b$ of the flyback transformer 1 is connected with the diode 3 in a manner as to be placed in a cut-off state when the switching element 2 is in an on state.

This shunt current $I_p$ is expressed by the following equation (2):

$$I_p = V_c \times t / L_p \quad (2)$$

where $Lp$ represents the inductance of the primary winding $1a$ of the flyback transformer 1; and t represents the time elapsed or charging time.

The shunt current $I_p$ gradually increases in proportion to the time elapsed t when the switching element 2 is in the closed state, as depicted in FIG. 4A.

Here, note that the cell charging current $I_{cel}$ is obtained by subtracting the shunt current $I_p$ from the battery charging current $I_{chg}$, as depicted in FIG. 4C.

Thus, the diode 3 is connected with the secondary winding $1b$ of the corresponding flyback transformer 1 in such a manner that it is in a cutoff state as long as the corresponding switching element 2 is in the closed state. Also, the diode 3 is connected with the upstream or input side of the constant current controller 8 so as to transmit the output of the secondary winding $1b$ of the corresponding flyback transformer 1 to the constant current controller 8.

In the switch driving operation of the switching element 2 based on the drive pulse signal, at the instant when the switching element 2 is switched over from the closed state into the open state, a corresponding bypass path is opened so that the surplus energy reserved in the flyback transformer 1 as described above is regenerated to the batch charging line as a feedback current $I_{bck}$ through the secondary winding $1b$ of the flyback transformer 1.

The feedback current $I^{bck}$ begins to flow at the instant when the switching element 2 is switched over from the closed state into the open state, and thereafter decreases gradually, as shown in FIG. 4B.

In this connection, note that a duration $t_{off}$ in which the feedback current $I_{bck}$ is flowing is expressed by the following equation (3):

$$t_{off} = (V_c \times t_{on} / L_p) \times (N_p \times L_s / N_s) / V_{bat} \quad (3)$$

wherein $V_c$ represents the cell voltage of the lithium ion battery cell $C_1$; $t_{on}$ represents the closing time of the switching element 2 due to the pulse width control; $L_s$ represents the inductance of the secondary winding $1b$ of the flyback transformer 1; $N_p$ represents the number of turns of the primary winding $1a$ of the flyback transformer 1; $N_s$ represents the number of turns of the secondary winding $1b$ of the flyback transformer 1; and $V_{bat}$ represents a total sum of the cell voltages of the lithium ion battery cells $C_1$–$C_n$.

The product It of the charging time and the charging current, which is charged to the lithium ion battery cell $C_1$ during the time when the switching element 2 is in the switch driving operation under pulse width control, is expressed by the following equation (4):

$$It = (I_{chg} - (V_c \times t_{on}^2) / (2 \times L_p \times t_c)) \times t \quad (4)$$

where $t_c$ represents a switching cycle.

In the switch driving operation of the switching element 2 under the pulse width control, the closing period of time $t_{on}$ of the switching element 2 in the pulse width control is controlled such that the product It of the charging current and the charging time as shown in equation (4) above is made, thereby preventing the lithium ion battery cell $C_1$ from being overcharged.

In addition, the flyback transformer 1 serves to regenerate the surplus energy, which is produced by the cell voltage $V_c$ and the shunt current $I_p$ shunted from the battery charging current $I_{chg}$ supplied from the constant current controller 8, to the batch charging line, thereby suppressing excessive heating in the cell shunt circuit section $Sh_1$.

The above-mentioned operation is similarly carried out in the remaining lithium ion battery cells $C_2$–$C_n$, so that the respective lithium ion battery cells $C_2$–$C_n$ can be prevented from being overcharged in the continued charging operation.

Here, it is to be noted that the output of the secondary winding $1b$ of each flyback transformer 1 is regenerated to a line connecting between the primary power supply 10 and the constant current controller 8, and the constant current controller 8 is controlled to output a constant current at all times. As a consequence, the lithium ion battery cell $C_1$ is always supplied with the constant battery charging current $I_{chg}$ even though feedback current $I_{bck}$ is regenerated from the secondary winding $1b$ of each flyback transformer 1 to the batch charging line.

Embodiment 2

Figure 2:
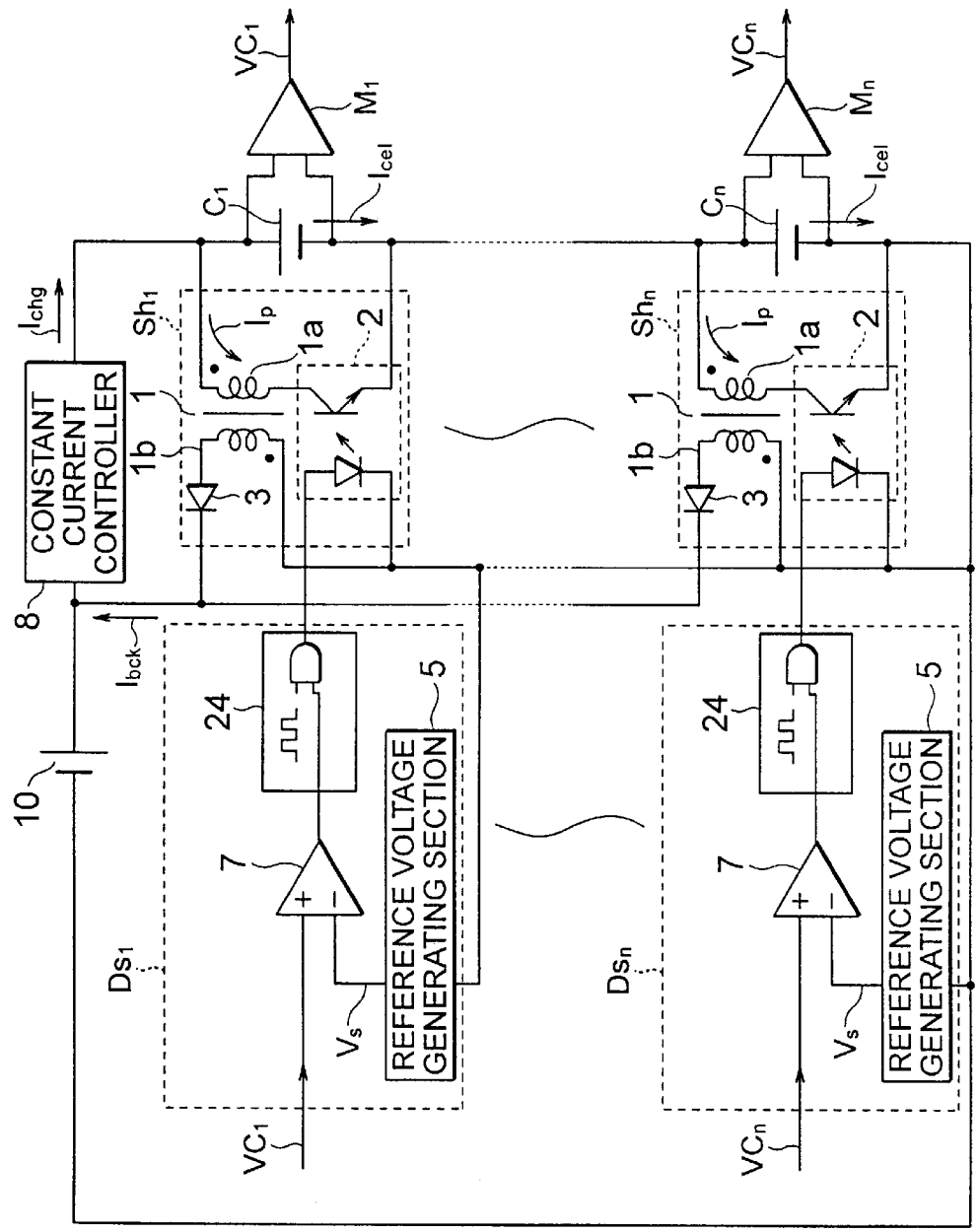
FIG. 2 is a constructional view illustrating a lithium ion battery charger according to a second embodiment of the present invention.

FIG. 2 is a circuit diagram illustrating a lithium ion battery charger according to a second embodiment of the present invention. In FIG. 2, symbols 1, 1a, 1b, 2, 3, 5, 8, 10, $C_1$–$Cn$, $M_{1-Mn}$, $Sh_1$–$Sh_n$, $I_{chg}$, $I_p$, $I_{cel}$, $I_{bck}$, and $VC_1$–$VC_n$ designate quite the same as in the above-mentioned first embodiment.

In the second embodiment, each of cell shunt driving sections $D_{s1}$–$D_{sn}$, which together constitute a cell shunt driving unit, is comprised of a reference voltage generating section 5, a comparator 7 having a hysteresis function, and a fixed pulse width switch driving section 24.

In the lithium ion battery charger constructed in the above manner, reference will be made to the case where the cell voltage $V_c$ across a lithium ion battery cell $C_1$ first reaches a charging completion voltage.

First of all, in the cell shunt driving section Ds1, the comparator 7 receives a detected voltage in the form of a cell voltage monitoring signal VC1 from the cell voltage detecting section M1, and compares its signal level with the reference voltage Vs which is preset to a value corresponding to the charging completion voltage in conformity with the cell voltage monitoring signal VC1. As a result of the comparison, the comparator 7 outputs a drive signal to the fixed pulse width switch driving section 24 when the cell voltage monitoring signal VC1 is greater than the reference voltage Vs.

Subsequently, the fixed pulse width switch driving section 24 receives a pulse signal of a fixed width at its first input terminal, and the drive signal from the comparator 7 at its second input terminal.

The fixed pulse width switch driving section 24 outputs, based on the drive signal input from the comparator 7, the pulse signal (hereinafter referred to as "a fixed driving pulse signal") input from the first input terminal to the switching element 2 of the cell shunt circuit section Sh1.

That is, the fixed pulse width switch driving section 24 is able to drive the switching element 2 based on the drive signal from the comparator 7 so that the switching element 2 performs switching operation with a fixed pulse width.

Thus, in the lithium ion battery charger of the second embodiment, too, as described above in the first embodiment, when a switching element 2 is closed, a shunt current Ip shunted from the battery charging current Ichg is permitted to flow into a corresponding flyback transformer 1, which then reserves surplus energy obtained from the shunt current Ip, whereas when the switching element 2 is opened, the surplus energy thus reserved in the flyback transformer 1 is regenerated to the batch charging line as a feedback current Ibck. In this manner, the lithium ion battery charger is able to prevent heating of the respective switching elements 2 of the cell shunt circuit sections Sh1–Shn.

Note that in the above operation, the shunt current Ip, the duration toff in which a feedback current Ibck is flowing, and the product It of the charging current and the charging time are expressed by equations similar to those (2), (3) and (4), respectively, employed in the first embodiment.

Here, in the fixed pulse width switching operation of the switching element 2 as described above, the product It of the charging current and the charging time as expressed by equation (4) above is set to be negative. That is, the closing time ton of the switching element 2 is set such that the corresponding lithium ion battery cell C1 discharges when the fixed pulse width switching operation is continued.

Accordingly, the fixed pulse width switch driving section 24 continues driving the corresponding switching element 2 to perform the fixed pulse width switching operation, thereby decreasing the cell voltage Vc across the lithium ion battery cell C1, as depicted in FIG. 5.

As a result, the comparator 7 of the cell shunt driving section $D_{s1}$ outputs a switching stop signal to the switch driving section 24 at the time when it detects that the cell voltage Vc across the lithium ion battery cell C1 falls below the charging completion voltage.

Here, note that the interval between the starting and the stopping of the fixed pulse width switching operation of the switching element 2 depends on the hysteresis characteristic of the comparator 7, as depicted in FIG. 5, in which a symbol Vsp represents a switch driving start level, and Vss a switch driving stop level.

Subsequently, the switch driving section 24 stops the fixed pulse width switching operation of the switching element 2 based on a switching stop signal received from the comparator 7.

Thus, the lithium ion battery charger is able to make the average value of the product It of the charging current and the charging time, as expressed by equation (4) above, to zero by repeating the above operation, thereby preventing the overcharging of the lithium ion battery cell $C_1$.

The above-mentioned operation is similarly carried out in the remaining lithium ion battery cells C2–Cn, so that the respective lithium ion battery cells C2–Cn can be prevented from being overcharged in the continued charging operation.

Embodiment 3

Figure 3:
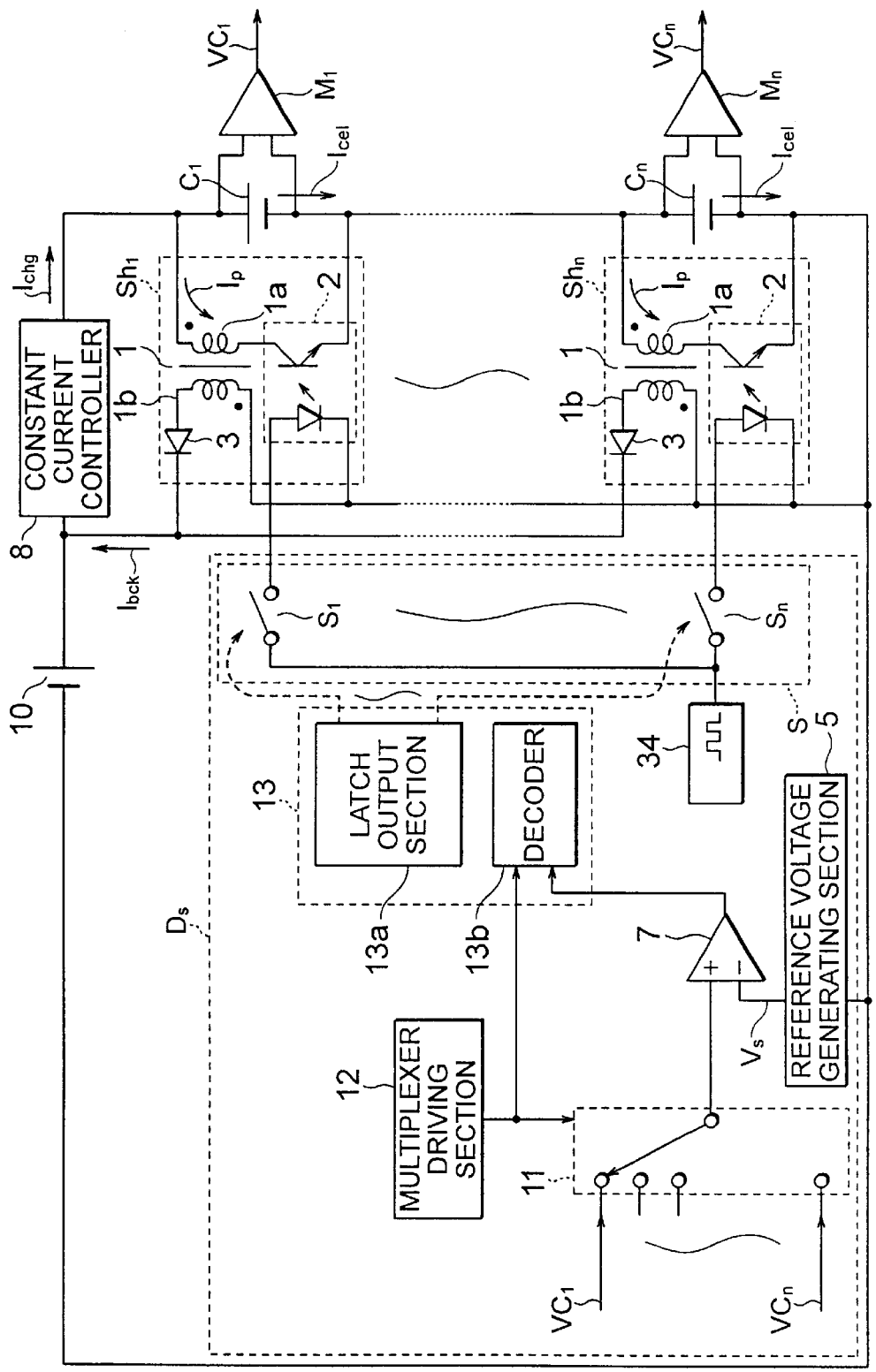
FIG. 3 is a constructional view illustrating a lithium ion battery charger according to a third embodiment of the present invention.
Figure 6:
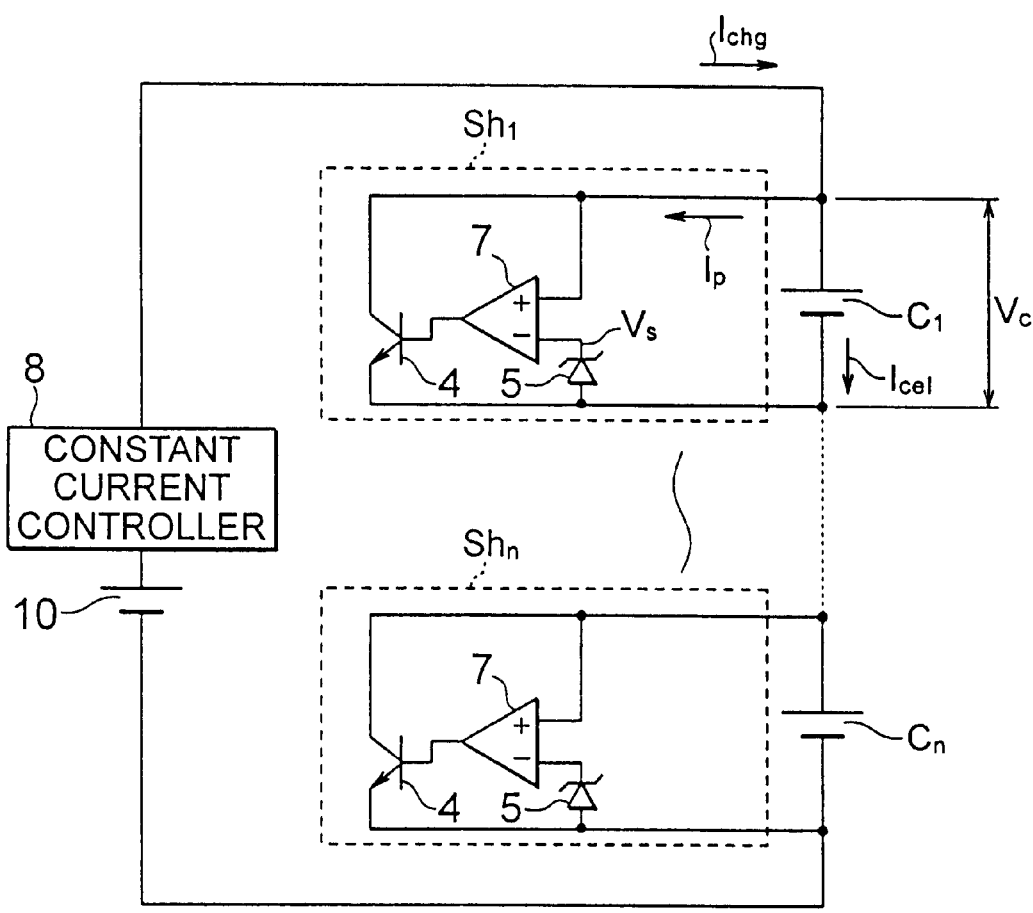
FIG. 6 is a constructional view illustrating a known lithium ion battery charger.

FIG. 3 is a circuit diagram illustrating a lithium ion battery charger according to a third embodiment of the present invention. In FIG. 3, symbols 1, 1a, 1b, 2, 3, 5, 8, 10, C1–Cn, M1–Mn, Sh1–Shn, Ichg, Ip, Icel, Ibck, and VC1–VCn designate quite the same as in the above-mentioned first and second embodiments, and a symbol 7 designates quite the same component as in the above-mentioned second embodiment.

The lithium ion battery charger according to the third embodiment includes, in addition to the above components, a cell shunt driving unit in the form of a single cell shunt driving section Ds which comprises a multiplexer 11, a multiplexer controller in the form of a multiplexer driving section 12, a switching section S comprised of a plurality of switches S1–Sn, a switch selection controller in the form of a switch selection latch controller 13 having a latch output section 13a and a decoder 13b, and a fixed pulse width switch driving section 34.

In the lithium ion battery charger as constructed above, the single cell shunt driving section Ds provided in common for the plurality of cell shunt circuit sections Sh1–Shn drives the cell shunt circuit sections Sh1–Shn, respectively, thereby preventing the lithium ion battery cells C1–Cn from being overcharged.

Actually, in the lithium ion battery charger, the multiplexer 12 performs a selection setting as to which of the plurality of cell voltage monitoring signals VC1–VCn from the cell voltage detecting sections M1–Mn is to be selected, and successively outputs multiplexer driving signals to the multiplexer 11 and the decoder 13b of the switch selection latch controller 13 based on such a selection.

Then, the multiplexer 11 successively acquires, based on the multiplexer driving signals from the multiplexer driving section 12, the cell voltage monitoring signals VC1–VCn from the plurality of cell voltage detecting sections M1–Mn, and sequentially outputs these signals to the comparator 7.

Here, reference will be made to the case where for example, the cell voltage Vc of the lithium ion battery cell C1 first reaches the cell charging completion voltage.

First of all, the comparator 7 receives, at its positive input terminal, a cell voltage monitoring signal VC1 from the multiplexer 11, and at its negative input terminal, a reference voltage Vs, compares the signal level of the cell voltage monitoring signal VC1 with the reference voltage Vs, and outputs a decoder driving signal representative of the result of the comparison to the decoder 13b of the switch selection latch controller 13.

Subsequently, the decoder 13b specifies a switch S1 corresponding to the lithium ion battery cell $C_1$ based on the multiplexer driving signal from the multiplexer driving section 12, and closes the thus specified switch $S_1$ through the latch output section 13a when it detects, based on the decoder driving signal from the comparator 7, that the signal level of the cell voltage monitoring signal VC1 is greater than the signal level of the reference voltage Vs.

As a result, the fixed pulse width switch driving section 34 outputs a fixed driving pulse signal to the switching element 2 of the cell shunt circuit section Sh1 via the now closed switch S1, whereby the switching element 2 is driven to perform a fixed pulse width switching operation in accordance with the fixed driving pulse signal.

In addition, when the cell voltage Vc across the lithium ion battery cell C1 falls below the charging completion voltage, the switch S1 is opened according to the same operation as described above, so that the fixed driving pulse signal supplied to the switching element 2 is interrupted, thus stopping the fixed pulse width switching operation of the switching element 2. That is, it is possible to prevent the overcharging of the lithium ion battery cell C1 according to the same operation as in the first embodiment.

Further, in the lithium ion battery charger of the third embodiment, too, as described above in the first and second embodiments, in the fixed pulse width switching operation of the switching element 2, when a switching element 2 is closed, a shunt current Ip shunted from the battery charging current Ichg is permitted to flow into a corresponding flyback transformer 1, which then reserves surplus energy obtained from the shunt current Ip, whereas when the switching element 2 is opened, the surplus energy thus reserved in the flyback transformer 1 is regenerated to the batch charging line as a feedback current Ibck.

The above-described operation is similarly carried out in the remaining lithium ion battery cells C2–Cn, so that the respective lithium ion battery cells C2–Cn can be prevented from being overcharged in the continued charging operation.

As described in the foregoing, according to the present invention, in cell shunt circuit sections provided as overcharge protective measures for individual battery cells, by regenerating surplus energy, which is generated by a cell voltage and a shunt current and which becomes a heat source, to a battery charger side as a feedback current via a flyback transformer, it is possible to prevent the surplus energy from being consumed as heat for heating the cell shunt circuit sections.

Further, according to a preferred embodiment of the present invention, in cell shunt driving sections for driving the cell shunt circuit sections, the pulse width of a driving pulse signal is controlled based on a difference between the cell voltage generated by a cell voltage monitoring signal and a reference voltage, so that a switching element is driven to perform switching operation in accordance with the driving pulse signal thus controlled. As a result, surplus energy can be regenerated to a charger side through a flyback transformer, thereby preventing heat generation.

Moreover, according to another preferred embodiment of the present invention, in cell shunt driving sections provided one for each of the cell shunt circuit sections, a fixed pulse driving signal is output to a switching element or stopped in accordance with the result of a comparison between a cell voltage generated by a cell voltage monitoring signal and a reference voltage, so that the switching element is driven to perform switching operation as required. Thus, surplus energy can be regenerated to a charger side through a flyback transformer, thereby preventing heat generation.

In addition, according to a further preferred embodiment of the present invention, in a cell shunt driving section provided in common for the cell shunt circuit sections, a fixed pulse driving signal is successively output to a switching element or stopped in accordance with the result of a comparison between a cell voltage generated by each of cell voltage monitoring signals successively supplied and a reference voltage, so that the switching element is driven to perform switching operation as necessary. Consequently, surplus energy can be regenerated to a charger side through a flyback transformer, thereby preventing heat generation.

While the invention has been described in terms of preferred embodiments, those skilled in the art will recognize that the invention can be practiced with modifications within the spirit and scope of the appended claims.

What is claimed is:

1. A battery charger for charging a plurality of battery cells connected in series with one another with a constant current in a batch manner, said battery charger including a plurality of cell shunt circuit sections connected in parallel with the battery cells, respectively, a plurality of cell voltage detecting sections for detecting cell voltages of said battery cells, respectively, and a cell shunt driving unit for driving said cell shunt circuit sections, respectively, each of said cell shunt circuit sections comprising:
an energy reservoir acting as a bypass path for bypassing a charging current supplied to a corresponding one of said battery cells so as to be input to the following battery cell provided at a downstream side of said one battery cell so as to reserve surplus energy obtained from the charging current thus bypassed and regenerate the thus reserved surplus energy to a batch charging line connected with said serially connected battery cells; and
a switching element inserted in said bypass path for opening and closing thereof;
wherein said cell shunt driving unit compares a voltage detected by each of said cell voltage detecting section with a reference voltage, and outputs to said switching element of each of said cell shunt circuit sections a drive pulse signal of a pulse width corresponding to a difference between said detected voltage and said reference voltage, and
wherein said energy reservoir regenerates said surplus energy to said batch charging line when said switching element opens said bypass path based on said drive pulse signal from said cell shunt driving unit.

2. The battery charger according to claim 1, wherein said energy reservoir comprises a flyback transformer having a primary winding and a secondary winding, said flyback transformer being operable to bypass a battery cell charging current flowing in its primary winding through said switching element and regenerate an output of its secondary winding in a direction of said batch charging line through a reverse-flow preventive diode.

3. The battery charger according to claim 1, wherein said cell shunt driving unit comprises a plurality of cell shunt driving sections provided one for each of said cell shunt circuit sections, each of said cell shunt driving sections comprising:

a differential amplifying section for comparing said voltage detected by a corresponding one of said cell voltage detecting sections and said reference voltage to output a difference therebetween; and a switch driving section for controlling the pulse width of said drive pulse signal in accordance with an output of said differential amplifying section thereby to control the opening and closing of a corresponding one of said switching elements based on the thus controlled pulse width.

4. The battery charger according to claim 1, wherein said cell shunt driving unit comprises a plurality of cell shunt driving sections provided one for each of said cell shunt circuit sections, each of said cell shunt driving sections comprising:

a comparator for comparing said voltage detected by a corresponding one of said cell voltage detecting sections with said reference voltage to generate an output signal representative of a comparison result; and a fixed pulse width switch driving section for outputting a fixed driving pulse signal with a preset pulse width to said corresponding switching element based on the output signal of said comparator.

5. The battery charger according to claim 1, wherein said cell shunt driving unit comprises a cell shunt driving section provided in common for said plurality of cell shunt circuit sections, said cell shunt driving section comprising:

a switching section including a plurality of switches connected with said switching elements, respectively;

a switch selection controller for selecting one of said switches of said switching section to control the opening and closing thereof;

a multiplexer controller for performing a selection setting of said voltage detected by each of said cell voltage detecting sections and notifying the selection setting to said switch selection controller;

a multiplexer for successively selecting and outputting one of said voltages detected by said plurality of cell voltage detecting sections based on said selection setting of said multiplexer controller;

a comparator for comparing said detected voltage output from said multiplexer with said reference voltage to generate an output signal representative of a comparison result; and a fixed pulse width switch driving section for outputting a fixed driving pulse signal with a preset pulse width;

wherein said switch selection controller closes, when detecting based on the output signal of said comparator that said detected voltage is greater than said reference voltage, the switch selected based on said selection setting of said multiplexer controller, and outputs said fixed driving pulse signal from said fixed pulse width switch driving section to a corresponding one of said switching elements through said closed switch.

* * * * *